United States Patent [19]

Nowak et al.

[11] 3,715,336
[45] Feb. 6, 1973

[54] COPOLYMERS OF VINYL AMINE AND VINYL ALCOHOL AS FLOCCULANTS

[75] Inventors: Robert M. Nowak; James T. K. Woo; Dietrich H. Heinert, all of Midland, Mich.

[73] Assignee: The Dow Chemical Company, Midland, Mich.

[22] Filed: Jan. 7, 1971

[21] Appl. No.: 104,814

[52] U.S. Cl. ................................260/77.5 BB, 210/54
[51] Int. Cl. ..............................................C08g 22/04
[58] Field of Search....260/77.5 BB, 91.3 PV, 89.7 N

[56] References Cited

UNITED STATES PATENTS

| | | | |
|---|---|---|---|
| 3,117,951 | 1/1964 | Itoi | 260/87.1 |
| 2,326,287 | 8/1943 | Coffman | 260/85.7 |
| 2,483,194 | 9/1949 | Gleim | 260/77.5 BB |

*Primary Examiner*—Donald E. Czaja
*Assistant Examiner*—M. J. Welsh
*Attorney*—Griswold & Burdick, R. G. Waterman, L. J. Dankert and M. S. Jenkins

[57] ABSTRACT

Vinyl amine/vinyl alcohol copolymers prepared by hydrolysis of vinyl carbamate/vinyl acetate copolymers serve as effective flocculants in the clarification of aqueous suspensions of finely divided inorganic solids.

6 Claims, No Drawings

COPOLYMERS OF VINYL AMINE AND VINYL ALCOHOL AS FLOCCULANTS

BACKGROUND OF THE INVENTION

This invention relates to novel vinyl amine/vinyl alcohol copolymers having valuable utility as flocculants.

In recent years marked improvement in ease of separation of finely-divided solids from aqueous suspension either by sedimentation or by filtration have been accomplished by incorporating small amounts of high-molecular weight water-soluble polymers in such suspensions. Among such polymers high-molecular weight polyacrylamide and hydrolysis products thereof have proved to be outstanding on a wide variety of ore suspensions. In some cases, however, the polyacrylamides and related hydrolysis products, while being highly effective for improving the separation of the major portion of the suspended solids, fail to agglomerate a portion of very finely-divided solids which remain in suspension and produce a turbid supernatant liquid.

Attempts to provide clear supernatant liquid using a wide variety of other high molecular weight polymers have been made. For example, the polyalkyleneimines and polyvinyl amines have been employed in some instances. The polyalkyleneimines are fairly good flocculants but are somewhat expensive. The polyvinyl amines are roughly comparable to the polyalkyleneimines in flocculating activity, but also require expensive precursors for their preparation and are generally difficult to prepare by well-known techniques. In addition, the polyvinyl amines, particularly the polyvinyl amine hydrochlorides, are extremely toxic to various forms of wildlife, thereby limiting their utility to flocculation of closed systems which do not contain wildlife.

In view of these deficiencies in prior art flocculants, it would be highly desirable to provide an effective, relatively inexpensive flocculant which is of much lower toxicity.

SUMMARY OF THE INVENTION

Accordingly, the foregoing desirable characteristics are found in the novel flocculants which constitute one aspect of the present invention. These novel flocculants are broadly described as copolymers of vinyl alcohol and vinyl amine. The present invention also concerns a method for the preparation of these novel copolymers and a method for flocculating aqueous suspensions of finely divided materials using such copolymers.

Surprisingly, the copolymers of the present invention, which contain appreciable amounts of vinyl alcohol and thus have lower concentrations of vinyl amine than does polyvinyl amine, are at least as effective as flocculants as is polyvinyl amine. Yet these novel copolymers are much less expensive and are less toxic than polyvinyl amine.

In addition to their utility as flocculants for aqueous suspensions of finely divided inorganic materials, the copolymers of the present invention are also useful as flocculants for other systems, e.g., dispersions of organic matter in water, and are useful as wet strength resins for paper when combined with epichlorohydrin.

DETAILED DESCRIPTION OF THE INVENTION

In the present invention, the term "copolymers of vinyl alcohol and vinyl amine" refers to (1) binary copolymers of from about 20 to about 85 mole percent of vinyl alcohol and from about 15 to about 80 mole percent of vinyl amine and (2) interpolymers of from about 20 to about 85 mole percent of vinyl alcohol, from about 15 to about 80 mole percent of vinyl amine and up to about 35 mole percent of ethylenically unsaturated monomer capable of polymerization through the ethylenic bond of the monomer with vinyl isocyanate, vinyl acetate or both. Preferred as flocculants are the interpolymers of from about 40 to about 60 mole percent of vinyl alcohol, from about 25 to about 40 mole percent of vinyl amine and from about 10 to about 35 mole percent of an alkyl N-vinyl carbamate wherein alkyl has from one to four carbon atoms. The copolymers of the present invention preferably have molecular weights (number average) as determined by membrane osmometry of from about 12,000 to about 40,000, although water-soluble copolymers which have molecular weights of up to 150,000 or more are also suitable. Preferred copolymers exist as tan to white powders in the dry state and are water-soluble at room temperature. It is understood that pendant amino groups on the copolymer chain may exist as amino ($-NH_2$) or ammonium ($-NH_3^+$), e.g., amine hydrochloride.

Exemplary ethylenically unsaturated monomers which may be present in the copolymers of the present invention in amounts up to about 35 weight percent include the lower alkyl esters of $\alpha,\beta$-ethylenically unsaturated mono- and di-carboxylic acids wherein the alkyl moiety has from 1 to 12 carbon atoms and the acid moiety has from three to eight carbon atoms, e.g., methyl methacrylate, ethyl acrylate, n-butyl acrylate, methyl ethacrylate, iso-butyl acrylate, diethyl maleate, ethyl itaconate and the like; the 1-alkenyl esters of saturated carboxylic acids and of aromatic carboxylic acids with alkenyl moieties of two to three carbon atoms, saturated carboxylic acid moieties of two to eight carbon atoms and aromatic carboxylic acid moieties of seven to 12 carbon atoms, e.g., vinyl acetate, vinyl propionate, allyl acetate and vinyl benzoate; and alkyl N-vinyl carbamates with alkyl moieties of 1 to 4 carbon atoms. For the purposes of alkyl N-vinyl carbamates, vinyl includes vinyl and alkyl substituted vinyl. Exemplary carbamates include methyl N-vinyl carbamate, ethyl N-vinyl carbamate, n-propyl N-vinyl carbamate, isopropyl N-vinyl carbamate, n-butyl N-vinyl carbamate, sec-butyl N-vinyl carbamate, methyl N-isopropenyl carbamate, n-propyl N-isopropenyl carbamate, n-butyl N-isopropenyl carbamate, and ethyl N-isopropenyl carbamate. Also included among suitable monomers are the $\alpha,\beta$-ethylenically unsaturated mono- and di-carboxylic acids having from three to eight carbon atoms, e.g., acrylic, methacrylic, maleic, itaconic, fumaric, aconitic, citraconic and the like, $\alpha,\beta$-ethylenically unsaturated amides having from three to eight carbon atoms, e.g., acrylamide, methacrylamide and fumaramide.

Although, in respect to the foregoing copolymers, the present invention is not limited to any particular method for their preparation, such copolymers are advantageously prepared by first, copolymerizing vinyl acetate with vinyl isocyanate and other ethylenically unsaturated monomers, if desired; second, reacting the isocyanate moiety with an alcohol to form carbamate; and finally hydrolyzing the acetate functionality to alcohol and carbamate functionality to amine. Alternatively, the second step of the foregoing procedure can be omitted by copolymerizing alkyl N-vinyl carbamate with vinyl acetate and other ethylenically unsaturated monomers (if desired). This latter technique is especially desirable in the preparation of copolymers having greater than 50 mole percent of the carbamate monomer.

Copolymerization can be carried out in a moisture- and oxygen-free atmosphere in the absence or presence of an inert solvent, e.g., dioxane, benzene, toluene, acetonitrile, tetrahydrofuran using ultraviolet light and/or free-radical generating catalyst, e.g., peroxide such as benzoyl peroxide and dicumyl peroxide, azo compound such as azobisisobutyronitrile, percarbonate such as isopropyl percarbonate, perester, or peracid, and temperature between about 25° and about 100° C.

Reaction of the isocyanate functionality with alcohol to form carbamate functionality can be effected by adding an alkanol having one to four carbon atoms to the copolymer of vinyl acetate and vinyl isocyanate dissolved in an inert solvent such as dioxane, chloroform, or carbon tetrachloride, preferably in the presence of an organometallic catalyst such as dibutyl tin diacetate. Such reaction may also be effected by dissolving the solid copolymers in an excess of the foregoing alkanol with or without addition of catalyst. Other materials known to catalyze the reaction of alcohols with isocyanates such as stannous octoate, triethylamine or triethylenediamine are also suitable. The order of addition is not particularly critical. However, the reaction is exothermic, therefore portionwise addition of the alkanol component to the component having isocyanate functionality is often desired in order to control the reaction temperatures. Reaction temperature is also not critical as it is found that the desired reaction proceeds at temperatures in the range from 0° to 150° C. Preferably, however, the reaction is carried out at ambient or near ambient temperatures, e.g., from 25° to 80° C. Since isocyanates react readily with water, the reaction is preferably conducted under essentially anhydrous conditions, i.e., not more than 1,000 ppm total of water present in the reaction mixture. In addition, it is preferable to carry out the reaction of isocyanate with alcohol under substantially oxygen-free conditions. An excess of alcohol relative to the isocyanate content of the polymer may be used, e.g., as much as ten or more moles of alcohol per mole of isocyanate group on the copolymer. However, since the reaction is substantially quantitative, preferred proportions are from one to slightly more than one mole of alcohol per mole of isocyanate group on the copolymer. When this reaction is carried out in a solvent, usually an inert halohydrocarbon mentioned before or inert hydrocarbon such as toluene or benzene can be employed in sufficient amounts such that the resulting reaction mixture is stirrable. Typically, one or two liters of solvent is sufficient if up to 1 gram mole of each reactant is employed.

Hydrolysis of the acetate and carbamate functionalities is carried out by dissolving the copolymer in aqueous acid. Preferably dissolution of the copolymer is HCl, effected by dispersing the copolymer in acid, e.g., 6N HCl and heating the resulting dispersion at 50° to 120° C for a period of 10 to 24 hours. The hydrolyzed copolymer is recovered by pouring the aqueous solution of the copolymer into an excess of water-miscible organic liquid, e.g., tetrahydrofuran, dioxane, methanol, propanol or other higher alcohol being non-solvent for the polymer and collecting the resulting precipitate by filtration. The solution of hydrolyzed copolymer can also be used directly after the acidity of the solution is adjusted by neutralization of the hydrochloric acid with sodium hydroxide, sodium carbonate, or other base, or by treatment with an ion exchange resin, or by removing the hydrochloric acid by distillation and redissolving the hydrolyzed copolymer residue in water at desired concentration.

In accordance with one aspect of this invention, the aforementioned copolymers are utilized as flocculating agents by distributing one or more of such copolymers in a suspension of finely divided inorganic solids in any fashion by which rapid, thorough mixing can be accomplished. It is desirable to avoid excessive agitation as such tends to increase the total flocculation time for the suspension. In a preferred method of operation, the copolymer is dissolved in water and introduced into the suspension in the form of a dilute aqueous solution.

Following the incorporation of the copolymer solution, the treated suspension is transferred with a minimum of agitation and shearing action into a quiescent zone such as a sedimentation vessel to allow the development and settling of agglomerates of the finely divided solids. In practice, the copolymer solution may be sprayed or otherwise introduced into a flume or other conduit through which the suspension is moving. In such operations, the conduit may be equipped with baffle plates or other means of mild agitation at or immediately following the point of introduction of the copolymer solution in order to assure thorough mixing. Preferably the copolymer solution is added portionwise or at a plurality of sites to accomplish thorough distribution of flocculant without local overtreatment.

Following the mixing of the solution of the copolymer with the suspension of finely divided solids, as set forth above, the treated suspension may be submitted to various conventional procedures for the concentration or separation of the solids from the suspension. For example, the treated suspension may be fed into a settling tank or thickener to effect the separation of a concentrated slurry of solids as an underflow product and a clarified aqueous effluent as an overflow product.

In the preparation of the copolymer solutions for use in the invention, it is generally convenient to prepare an aqueous concentrate or stock solution containing from about 0.5 to about 10 percent by weight of copolymer and to dilute such stock solution as needed for use. The dilute treating solutions actually added to the suspension preferably contain from about 0.01 to about 0.1 percent by weight of the copolymer.

The amount of copolymer to be employed in a particular suspension will vary depending upon the type of solids, the degree of subdivision thereof and the rate of settling required. With highly amenable solids, such as certain chemical precipitates, excellent improvement in settling rate and clarity of supernatant liquid are obtained when employing only 0.001 pound of copolymer per ton of suspended solids. For most finely ground minerals, good results are obtained when employing from about 0.01 to about 0.1 pound of the copolymer per ton of suspended solids although loadings ranging up to 1 or 2 pounds of copolymer per ton of solids may sometimes be required, particularly when the solids are to be filtered following treatment. In any case, an amount sufficient to increase the rate of sedimentation of the solids is employed. In some cases, the copolymers are conveniently employed in conjunction with other flocculants such as polyacrylamides or glue.

Typical solids which are advantageously flocculated by the copolymers of the present invention are various clays, minerals, ores, organic materials such as in sewage, and the like.

The following examples illustrate the invention, but are not to be construed as limiting same. All parts and percentages listed herein are by weight unless otherwise indicated.

EXAMPLE 1

Into a steel pressure reactor can which has been heated at 100° C for 4 hours to drive off moisture, filled with an atmosphere of dry nitrogen and cooled to room temperature, are added 90.4 grams of vinyl acetate which has been dried over a molecular sieve and 31.1 grams of freshly distilled vinyl isocyanate. A 2.43-gram portion of isopropyl percarbonate as 10 percent solution in benzene is added to the foregoing ingredients. The reactor is sealed and placed in an agitated water bath heated to 40° C for 24 hrs to effect polymerization of the monomeric materials. After which time, the reactor is opened and unreacted monomer and other low boiling material is evaporated. A 100-ml portion of methanol is poured into the vessel containing the polymeric residue to convert isocyanate functionality to carbamate functionality. A portion of the polymeric material is isolated and analyzed and found to be a vinyl acetate/methyl N-vinyl carbamate copolymer having a molecular weight of 28,000 as determined by membrane osmometry. The remaining methanol solution of the copolymer is added to 6N HCl (at ratio of 500 cc of 6N HCl per 50 g of polymer) in 1 liter round bottom flask and refluxed at 70° C for 24 hours.

The resulting aqueous solution of hydrolyzed copolymer is poured into stirred tetrahydrofuran to precipitate the copolymer and the copolymer is collected by filtration. The copolymer is determined by NMR to be a vinyl alcohol/vinyl amine hydrochloride/methyl N-vinyl carbamate copolymer (45/31/24 mole percent).

A portion of the copolymer is dissolved in water to form a 0.51 percent solution. Two drops of this solution are added to a 10-ml suspension of Minco Bond clay in water. Flocculant activity of the copolymer in settling rate and clarity of supernatant are recorded in Table I.

For the purposes of comparison, identical amounts (2 drops of ~0.50 percent solutions) of other known flocculants are added to 10-ml samples of the Minco Bond clay suspension. Settling rates and supernatant clarity for these comparative samples ($B_1$–$B_3$) are also recorded in Table I. In addition, a control sample ($C_1$) is tested for sedimentation rate by allowing a 10-ml sample of the Minco Bond clay suspension containing no flocculant to stand for a period. This rate and clarity of the suspension is also shown in Table I.

TABLE I

| Sample No. | Flocculant (1) | Conc. of monomeric Amine (2) mole percent | Settling rate, ml/ min (3) | Clarity (4) |
|---|---|---|---|---|
| 1 | VOH/VNH$_2$·HCl/VNHCO$_2$CH$_3$ | 31 | 2.4 | very good |
| $B_1$* | PVB/N(CH$_3$)$_3$Cl | 100 | 2.4 | Good |
| $B_2$* | PEI | 100 | 2.4 | Good |
| $B_3$* | PVNH$_2$·HCl | 82 | 2.4 | Good |
| $C_1$* | — | — | ≈0.029 | Poor |

* Not an example of the invention.
(1) VOH/VNH$_2$·HCl/VNHCO$_2$CH$_3$ - vinyl alcohol/vinyl amine hydrochloride/methyl N-vinyl carbamate copolymer (45/31/24). PVB/N (CH$_3$)$_3$Cl - polyvinylbenzyl trimethylammonium chloride. PVNH$_2$·$^{HCl}$ - polymerized vinyl amine hydrochloride. PEI - polyethyleneimine.
(2) Concentration of amino-bearing monomer in the flocculant in mole percent.
(3) Each suspension of clay particles is shaken with the added flocculant in a 10-ml graduated cylinder. After thorough mixing is achieved, each suspension is allowed to stand, and the settling rate of the flocculated clay particles is recorded in milliliters per minute. In the control sample ($C_1$), the same procedure is carried out except no flocculant is added.
(4) Visual observation.

EXAMPLE 2

Into a moisture-free, 500-ml round bottom flask containing 200 mls of freshly distilled benzene and 0.48 g of isopropyl percarbonate, are added 56 mls of freshly distilled vinyl acetate and 6 mls of vinyl isocyanate. The resulting mixture is then polymerized at 40° for 93 hours. A portion of the copolymer solution is withdrawn, analyzed and found to contain vinyl acetate/vinylisocyanate copolymer (68/32 mole percent). The remaining copolymer solution is poured into 300 mls of methanol with stirring to form a clear solution of copolymer in the methanol after all of the copolymer solution is added. The solution of the copolymer in methanol is evaporated to remove all unreacted methanol and then redissolved in 50 ml of methanol.

This methanol solution of copolymer is slowly added to 100 mls of 6N HCl, and the resulting mixture is refluxed for 60 hours at 105° C. The copolymer is precipitated by pouring the refluxed mixture into tetrahydrofuran with stirring.

A portion of the copolymer is dissolved in water to form a 0.585 percent solution. Two drops of this solution are added to a 10-ml suspension of Minco Bond clay in water. A settling rate of about 1.3 ml per minute and very good clarity of supernatant are observed.

What is claimed is:

1. A copolymer of from about 20 to about 85 mole percent of vinyl alcohol, from about 15 to about 80 mole percent of vinyl amine and from about 10 to about 35 mole percent of alkyl N-vinyl carbamate wherein alkyl has from one to four carbon atoms.

2. The copolymer according to claim 1 containing up to about 35 mole percent of ethylenically unsaturated monomer copolymerizable through the ethylenic bond with at least one of vinyl isocyanate and vinyl acetate.

3. An interpolymer of from about 40 to 60 mole percent of vinyl alcohol, from about 25 to about 40 mole percent of vinyl amine and from about 10 to about 35 mole percent of alkyl N-vinyl carbamate wherein alkyl has from one to four carbon atoms, said copolymer having a molecular weight from about 12,000 to about 40,000.

4. The copolymer according to claim 3 which is an interpolymer of 45 mole percent of vinyl alcohol, 31 mole percent of vinyl amine, and 24 mole percent of methyl N-vinyl carbamate.

5. A method for the preparation of copolymers of vinyl alcohol and vinyl amine comprising the steps of (1) copolymerizing vinyl acetate with vinyl isocyanate, (2) reacting the isocyanate functionality of the resulting copolymer with alkanol having one to four carbon atoms to form the corresponding carbamate functionality and (3) subjecting the copolymer to hydrolyzing conditions sufficient to convert at least a portion of the carbamate functionality to amine functionality and at least a portion of the acetate functionality to alcohol functionality.

6. The method according to claim 5 comprising the steps of (1) copolymerizing vinyl acetate and vinyl isocyanate in a moisture- and oxygen-free atmosphere in the presence of a free-radical generating catalyst and at temperatures between about 25° and about 100° C, (2) reacting the isocyanate functionality of the resulting copolymer with excess alkanol having from one to four carbon atoms in the presence of dibutyl tin diacetate at temperatures between about 0° and about 150° C and (3) dissolving the copolymer in aqueous acid by dispersing the copolymer in aqueous acid and heating the resulting dispersion at a temperature between about 50° and about 120° C for a period of 10 to 24 hours.

* * * * *

PO-1050
(5/69)

UNITED STATES PATENT OFFICE
CERTIFICATE OF CORRECTION

Patent No. 3,715,336                Dated February 6, 1973

Inventor(s) Robert M. Nowak; James T. K. Woo; Dietrich H. Heinert

It is certified that error appears in the above-identified patent and that said Letters Patent are hereby corrected as shown below:

Column 4, line 4, delete "HCl," at the beginning of the sentence.

Table I, under the 2nd column "Flocculant(1)", third line down the formula "PBV/N(CH$_3$)$_3$Cl100" should read --PVB/N(CH$_3$)$_3$Cl--.

All the figures appearing after the formulas should have been under the third column "Conc. of monomeric Amine (2) mole percent" so that the 2nd and 3rd columns read as follows:

| Flocculant(1) | Conc. of monomeric Amine (2) mole percent |
|---|---|
| VOH/VNH$_2$·HCl/VNHCO$_2$CH$_3$ | 31 |
| PVB/N(CH$_3$)$_3$Cl | 100 |
| PEI | 100 |
| PVNH$_2$·HCl | 82 |

Signed and sealed this 10th day of July 1973.

(SEAL)
Attest:

EDWARD M. FLETCHER, JR.
Attesting Officer

Rene Tegtmeyer
Acting Commissioner of Patents